A. S. VOGT.
TRACK SCALE.
APPLICATION FILED MAR. 3, 1919.
Reissued June 24, 1919.
14,675.
4 SHEETS—SHEET 1.
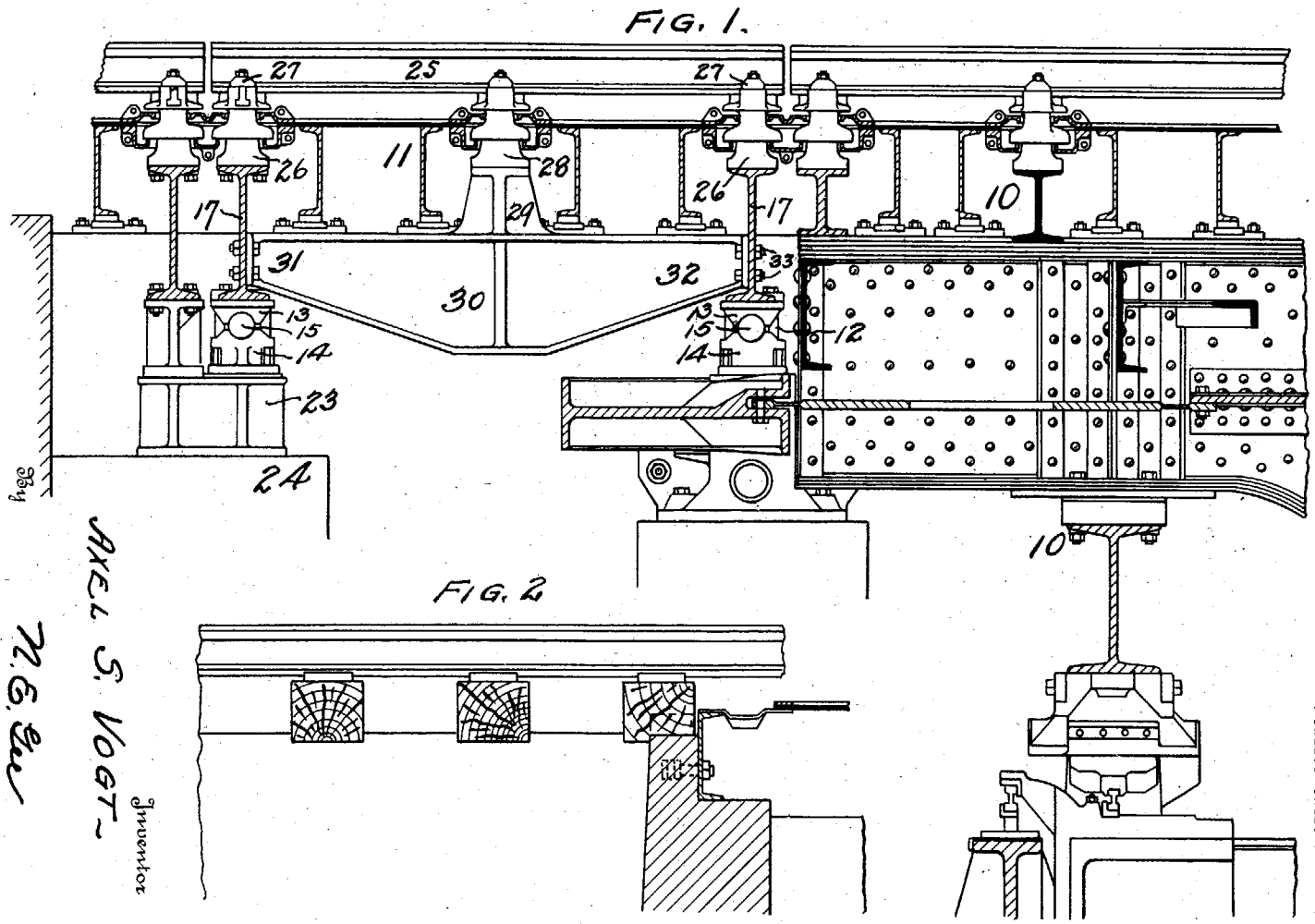
Inventor
AXEL S. VOGT
By N. E. Gee
Attorney
THE NORRIS PETERS CO. PHOTO-LITHO., WASHINGTON, D. C.

A. S. VOGT.

TRACK SCALE.

APPLICATION FILED MAR. 3, 1919.

Reissued June 24, 1919.

14,675.

4 SHEETS—SHEET 2.

Inventor

AXEL S. VOGT

By N. E. Gee

Attorney

THE NORRIS PETERS CO., PHOTO-LITHO. WASHINGTON, D. C.

A. S. VOGT.
TRACK SCALE.
APPLICATION FILED MAR. 3, 1919.
Reissued June 24, 1919.
14,675.
4 SHEETS—SHEET 3.
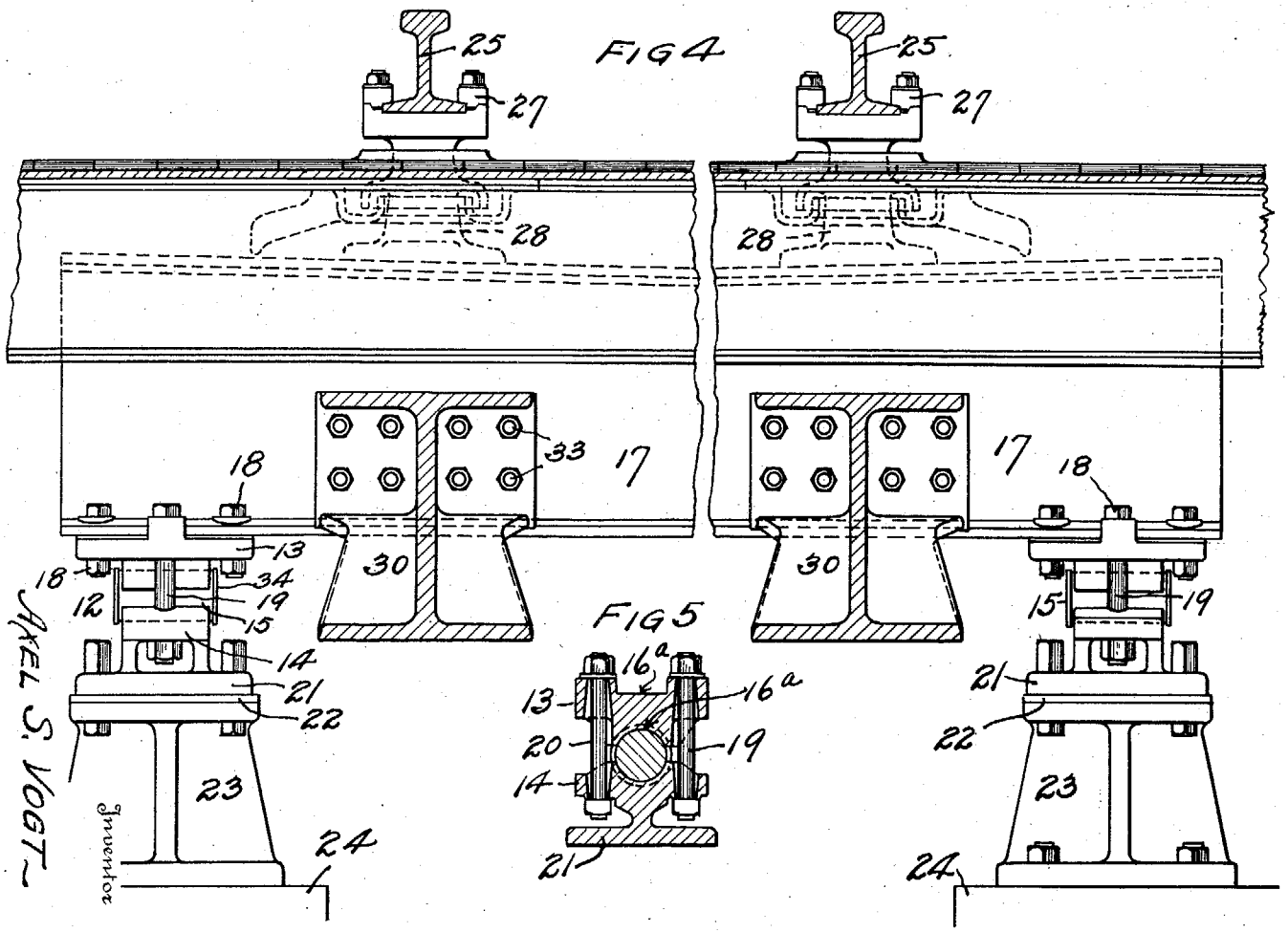
Inventor
AXEL S. VOGT
By N. E. Lee
Attorney
THE NORRIS PETERS CO., PHOTO-LITHO., WASHINGTON, D. C.

A. S. VOGT.

TRACK SCALE.

APPLICATION FILED MAR. 3, 1919.

Reissued June 24, 1919.

14,675.

4 SHEETS—SHEET 4.

INVENTOR
AXEL S. VOGT—
By N. E. Gee
Attorney—

THE NORRIS PETERS CO., PHOTO-LITHO., WASHINGTON, D. C.

UNITED STATES PATENT OFFICE.

AXEL S. VOGT, OF ALTOONA, PENNSYLVANIA.

TRACK-SCALE.

14,675. Specification of Reissued Letters Patent. Reissued June 24, 1919.

Original No. 1,269,231, dated June 11, 1918, Serial No. 159,526, filed April 3, 1917. Application for reissue filed March 3, 1919. Serial No. 280,494.

*To all whom it may concern:*

Be it known that I, AXEL S. VOGT, a subject of the King of Sweden, residing at Altoona, in the county of Blair and State of Pennsylvania, have invented certain new and useful Improvements in Track-Scales, of which the following is a specification.

This invention relates to the subject of track scales and has for its primary object an immediate approach section which is susceptible of being readily adjusted vertically to meet the varying conditions of the track rails adjacent to the scale.

Another object of this invention is to provide self-alining bearings for the ends of the approach sections, each bearing of which is attached to transverse I-beams which carry the center of the approach section.

With these and many other objects in view which will become more readily apparent as the nature of the invention is better understood, the same consists of the novel construction, combination and arrangement of parts as will be hereinafter fully described, illustrated and claimed.

It will be readily understood by those skilled in the art to which this invention belongs, that the same is susceptible of some structural modification or change without departing from the spirit or scope of the invention, but a preferred and practicable embodiment of the same is shown in the accompanying drawings, in which:—

Figure 1 is a side elevation of the present scale approach, showing a portion of the track adjacent the approach, together with a portion of the main track leading to the approach section.

Fig. 2, is a view showing more in detail a portion of the approach of the main track.

Fig. 4 is a view taken on the line 4—4 of Fig. 3, and shows the manner of assembling the bearings at either end of the approach section.

Fig. 5 is a sectional view of the bearing at either end of the approach section, and shows the manner of locking the parts together to prevent transverse movement of the approach section.

Figure 3:
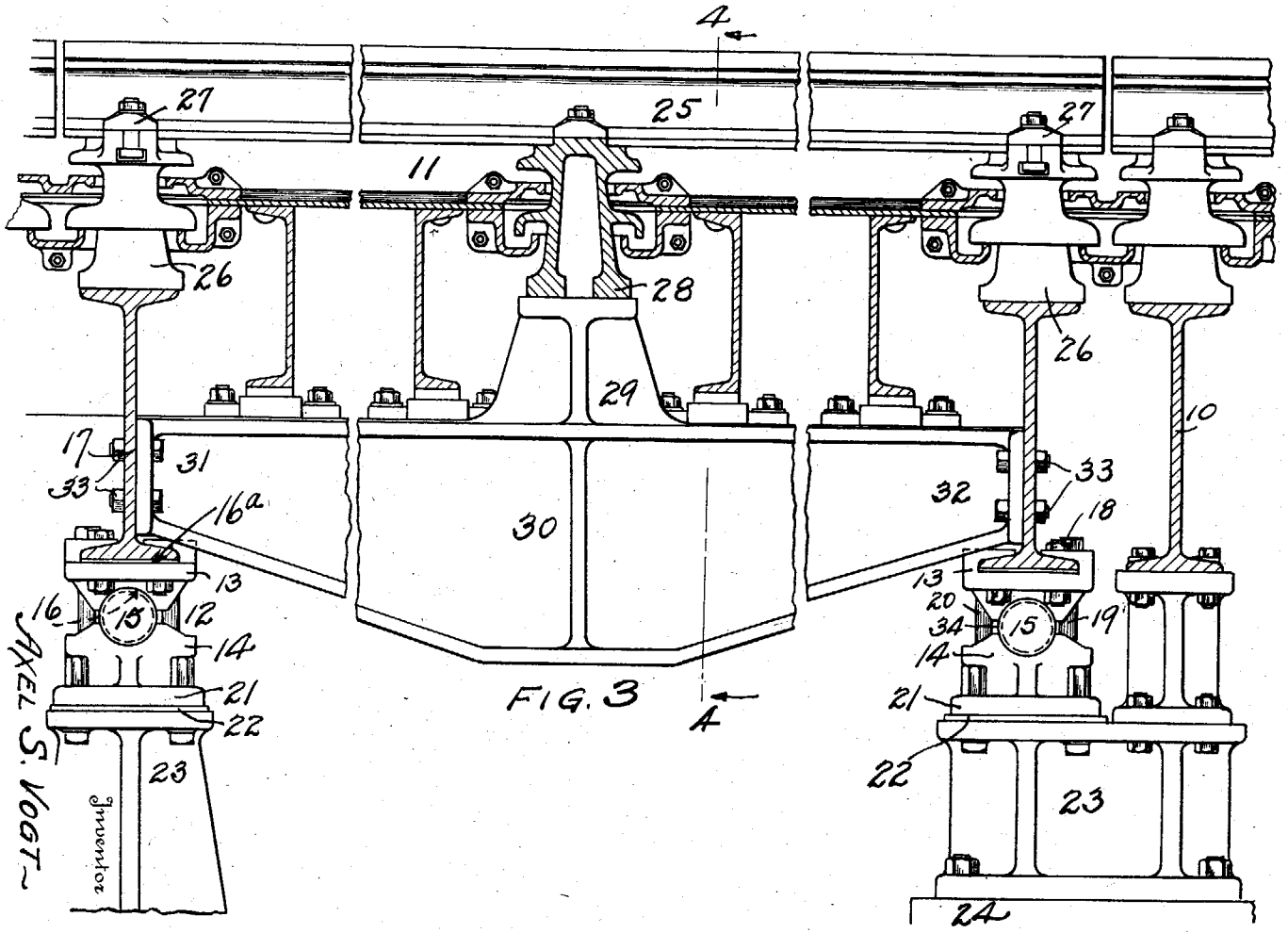
Fig. 3 is an enlarged view of the approach section, showing more clearly the method of supporting the ends of the section.
Figure 6:
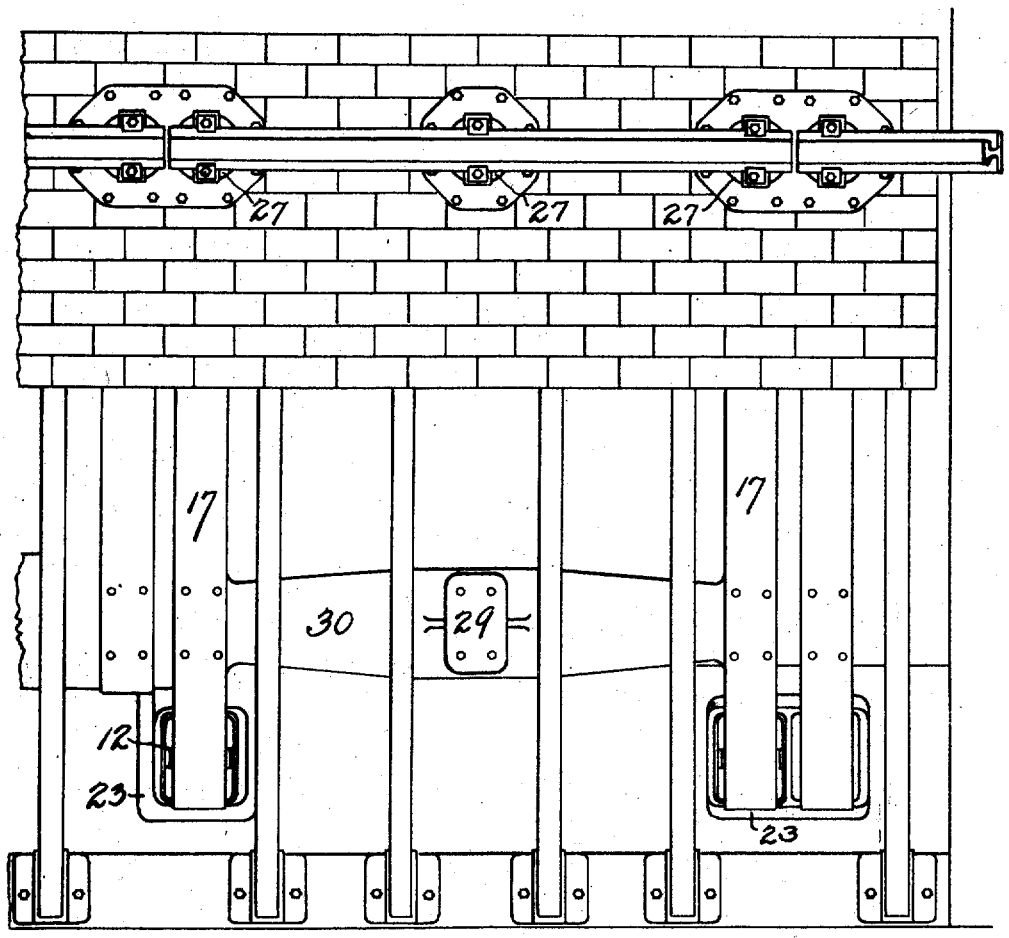
Fig. 6 is a plan view of the approach section with the rail and the cover removed from one-half of the section.

In carrying out this invention there is contemplated in connection with a track scale, designated in its entirety by the numeral 10, an approach section 11, which is adapted to be supported at either end by suitable self-alining bearings 12, which essentially consist of an upper portion 13, and a lower portion 14, between which there is positioned a spool 15. The upper portion 13 of the bearing 12 has formed on its lower face a concave surface 16 which is adapted to fit snugly over the cylindrical portion of the spool 15. The lower portion 14 of the bearing 12 is provided with a concave surface similar to the one in the upper portion of the bearing and thus fits around the cylindrical surface of the spool 15 from beneath. These three cooperating elements serve to form a very efficient self-alining bearing for the purpose intended.

The upper portion 13 of the bearing 12, is provided with a surface 16[a], upon which rests an I-beam 17, designed to carry one end of the approach section 11. The I-beam 17 is attached to the bearing 12 through suitable bolts or fastening means 18, while provision is made for locking the two portions 13 and 14 of the bearing together through bolts 19 and 20. These bolts are provided for the purpose of locking the two portions of the bearing together after the height of the section has been determined, as well as to serve the purpose of preventing transverse motion of the approach section 11, while rolling stock is passing over the section.

The bottom portion 14 of the bearing 12 is provided with a base 21, which is adapted to rest upon plates or liners 22 which can be added to, in order to raise either end of the section, or be removed to lower the same, thus making the bearings adjustable vertically to attain perfect track alinement. The liners or plates are adapted to rest upon a pedestal casting 23, which is designed to rest upon the foundation 24.

The wheel-weight of the rolling stock which passes over the rail 25, is transferred to the I-beams 17 through suitable rail columns 26, the rail being clamped to the columns through rail clamping means 27.

In order to carry the center of the rail 25, there is provided a rail column 28, positioned in the center of the section and designed to rest upon an upstanding column 29, preferably made integral with a longitudinal girder casting 30, which is secured at its ends 31 and 32 to the I-beams 17 through suitable fastening means 33.

For the purpose of facilitating the assembly of the approach section parts, provision is made to pour stereotype metal between the bottom of the I-beams 17 and the surface 16 of the upper portion 13 of the bearing 12. This method has been found to be very satisfactory where extreme accuracy is desired and one of the other, or both adjoining surfaces are not machined.

It will be quite obvious, from the drawings which show the arrangement of the approach section, that the bearings 12, positioned at either end of the said approach section, lend themselves readily to be either raised or lowered for the purpose of track alinement, and while the approach section is being raised at one end the bearing at the opposite end finds a new seat upon the spool 15, or the bearing finds a new seat automatically, and this function may be said to constitute a feature of the present invention.

For the purpose of augmentatively keeping the approach section from moving in a transverse direction, there are provided collars 34 on the spool 15, which engage the upper and lower members of the bearing 12, thus locking one member upon the other which effectively assists in preventing transverse motion.

From the foregoing it will be apparent that the present invention aims to provide an approach track section which includes a rigid supporting unit consisting of a plurality of transverse beams including the beams 17, and suitable longitudinally disposed beams 30, and also the rail engaging supports 26 for supporting the opposite ends of the rails 25 and the intermediate rail engaging supports 28 for engaging the middle of said rails. Thus, all of the rail engaging supports are rigidly connected, and for the purpose of permitting the proper movement of the approach track section with reference to the main and scale track sections, one end of the rigid supporting unit is mounted upon a suitable spool bearing carried by a stationary abutment or support, while the opposite end is also mounted on a spool bearing resting upon a stationary support. And, in order to maintain the opposite ends of the rails 25 in proper alinement with the adjacent ends of the main and scale track sections it is proposed to provide means for adjusting the opposite ends of the rigid supporting unit, each independent of the other, by means of the wear liner plates 22. This feature is important since it provides the necessary adjustment to properly true up the approach track section with reference to the main and scale track sections.

Having thus described my invention, what I claim and desire to be secured by Letters Patent, is:

1. In combination with a track scale, the scale, a track on the scale and a track leading from the main road-way to the scale, an immediate approach section for the scale interposed between the rails on the scale and the rails leading to the main road-way, transverse members forming a part of the approach section, bearings carrying the ends of the transverse members, means for supporting the said bearings, and means adapted to be interposed between the support means and said bearings for raising and lowering the ends of the approach section independent of each other.

2. In combination with a track scale, an approach section for the scale, transverse end members for carrying the weight of the approach section, longitudinal girders interposed between the transverse members and attached thereto, means for supporting the center of the rail on the approach section upon the said longitudinal girders, and spool bearings including means for preventing the transverse and longitudinal movements of the approach section.

3. In combination with a track scale, an approach section for the scale, transverse and longitudinal members forming a part of the approach section, rail supporting means carried by the said transverse and longitudinal members, bearings positioned at the ends of the longitudinal members, and in immediate contact with the transverse members, upper members of the bearings adapted to be secured to the said transverse members, lower members adapted to rest upon removable liners, foundation supports for the bottom members, concave surfaces in the adjacent faces of the two members, a spool member adapted to coöperate with each of the said concave surfaces, and means for locking the surfaces of the bearing together to prevent transverse movement on the approach section.

4. In a track scale, the combination with the main track and the scale track, of stationary supports, an approach track section located between the main and scale tracks, bearings mounted upon the supports, said bearings including connected bearing blocks and an intermediate bearing spool, and removable and replaceable wear liners interposed between the lowermost block and the support.

5. In a track scale, the combination with the main track and scale track, of an approach track section interposed between the main and scale track sections, and means for supporting said approach track section including transverse beams carrying track engaging devices located at each end of the section, and longitudinally disposed beams connecting the transverse beams and having means at their intermediate portion for engaging and supporting the intermediate portion of the scale track section, bearings fitted to the said transverse beams, and stationary supports for said bearings mounted on fixed abutments.

6. In a track scale the combination with the main track and the scale track, of an approach section located between the main and scale tracks, a rigid rail engaging and supporting frame for carrying the rails of the approach track section, and stationary spool-bearing supports for both ends of said frame.

7. In a track scale the combination with the main track and the scale track of an approach track section located between the main and scale tracks, a plurality of spaced rigidly connected rail engaging supports for the rails of the approach track section, stationary supports for both ends of said rigidly connected rail supports, and means for maintaining the level of the rigidly connected rail supports with respect to the stationary supports independent of each other.

8. In a track scale, the combination with the main track and the scale track, of an approach track section including a frame carrying the approach track and interposed between the main and scale track sections, and means for maintaining either end of the frame of the approach track section at the desired level independent of the other to bring the same flush with the adjacent end of either the main or scale track section.

9. In a track scale the combination with the main track and scale track, of an approach track section interposed between the main and scale tracks, a rigid supporting unit carrying the rails of the approach track section and including rail engaging elements located at each end thereof for engaging the opposite end of the rails of the approach track section and also an intermediate upstanding rail engaging support, means for movably supporting said rigid approach track-supporting unit, and means for maintaining each end of the latter at the desired level independent of the other.

In testimony whereof I hereunto affix my signature in the presence of two witnesses.

AXEL S. VOGT.

Witnesses:
J. T. HANLON,
N. E. GEE.

Copies of this patent may be obtained for five cents each, by addressing the "Commissioner of Patents, Washington, D. C."